United States Patent
Fox, Jr.

(10) Patent No.: US 8,210,479 B2
(45) Date of Patent: *Jul. 3, 2012

(54) PARACHUTE INLET CONTROL SYSTEM AND METHOD

(76) Inventor: Roy L. Fox, Jr., Belleville, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/325,344

(22) Filed: Dec. 14, 2011

(65) Prior Publication Data

US 2012/0080561 A1    Apr. 5, 2012

Related U.S. Application Data

(63) Continuation of application No. 12/535,099, filed on Aug. 4, 2009, now Pat. No. 8,096,509.

(60) Provisional application No. 61/086,959, filed on Aug. 7, 2008.

(51) Int. Cl.
*B64D 17/62* (2006.01)

(52) U.S. Cl. ........................... 244/152; 244/149

(58) Field of Classification Search .................. 244/142, 244/143, 145, 146, 147, 150, 149, 152; 446/49
See application file for complete search history.

(56) References Cited

U.S. PATENT DOCUMENTS

| | | |
|---|---|---|
| 2,483,088 A | 9/1949 | De Haven |
| 2,502,097 A | 3/1950 | Linder |
| 2,665,163 A | 1/1954 | Gross |
| 2,712,913 A | 7/1955 | Stanley |
| 2,774,560 A | 12/1956 | Johnson |
| 2,924,408 A | 2/1960 | Yost |
| 3,110,459 A | 11/1963 | Heinrich |
| 3,122,392 A | 2/1964 | Benditt et al. |
| 3,266,757 A | 8/1966 | Guienne |
| 3,466,081 A | 9/1969 | Femia |
| 3,692,262 A | 9/1972 | Gaylord |
| 4,030,689 A | 6/1977 | Rodriguez |
| 4,050,381 A | 9/1977 | Heinemann |
| 4,155,286 A | 5/1979 | Mihm |
| 4,161,301 A | 7/1979 | Beardsley et al. |
| 4,256,012 A | 3/1981 | Cowart et al. |
| 4,337,913 A | 7/1982 | Booth |
| 4,339,098 A | 7/1982 | Tardot et al. |
| 4,342,437 A | 8/1982 | Farinacci |
| 4,392,411 A | 7/1983 | Minkler |
| 4,493,240 A | 1/1985 | Norton |
| 4,592,524 A | 6/1986 | Nohren et al. |
| 4,697,765 A | 10/1987 | Wimmer |

(Continued)

OTHER PUBLICATIONS

Restriction Requirement dated Feb. 23, 2010 for U.S. Appl. No. 12/535,099.

(Continued)

*Primary Examiner* — Benjamin P Lee
(74) *Attorney, Agent, or Firm* — Snell & Wilmer L.L.P.

(57) ABSTRACT

A parachute inlet control system is configured to provide an improved inflation profile for solo and/or clustered parachutes. An inlet parachute is coupled to a main parachute via a plurality of lacing loops and/or reefing rings. The lacing loops may be passed through the reefing rings and/or may be routed around one or more of the main parachute suspension lines. The inlet parachute is located in the inlet area of the main parachute, and causes the inlet of the main parachute to rapidly form a desirable shape. The inlet parachute and lacing loops function as a reefing means, and prevent full inflation of the main parachute until a reefing cutter has functioned. In this manner, parachute failures, such as those due to leading and/or lagging parachutes in a parachute cluster, may be reduced or eliminated.

20 Claims, 15 Drawing Sheets

(BOTTOM VIEW)

U.S. PATENT DOCUMENTS

| | | | |
|---|---|---|---|
| 4,750,404 | A | 6/1988 | Dale |
| 4,765,571 | A | 8/1988 | Barbe |
| 4,955,564 | A | 9/1990 | Reuter |
| 4,998,480 | A | 3/1991 | Denis et al. |
| 5,003,882 | A | 4/1991 | Frehaut et al. |
| 5,205,517 | A | 4/1993 | Reuter |
| 5,361,676 | A | 11/1994 | Gibbs |
| 5,618,011 | A | 4/1997 | Sadeck et al. |
| 5,668,346 | A | 9/1997 | Kunz et al. |
| 5,703,315 | A | 12/1997 | Coggan |
| 2,834,083 | A | 5/1998 | Newell et al. |
| 5,816,535 | A | 10/1998 | Underwood |
| 5,884,867 | A | 3/1999 | Gordon et al. |
| 5,887,825 | A | 3/1999 | Noel |
| 5,890,678 | A | 4/1999 | Butler, Jr. |
| 5,899,415 | A | 5/1999 | Conway et al. |
| 6,070,832 | A | 6/2000 | Redd |
| 6,249,937 | B1 | 6/2001 | Grenga |
| 6,260,797 | B1 | 7/2001 | Palmer |
| 6,308,642 | B1 | 10/2001 | Branham |
| 6,339,929 | B1 | 1/2002 | Udagawa et al. |
| 6,644,597 | B1 | 11/2003 | Bahniuk |
| 6,669,146 | B2 | 12/2003 | Lee et al. |
| 6,789,766 | B2 | 9/2004 | Horst |
| 7,252,270 | B2 | 8/2007 | Mitzmacher |
| 7,264,205 | B2 | 9/2007 | Fox, Jr. |
| 7,967,254 | B2 | 6/2011 | Fox |
| 8,033,507 | B2 | 10/2011 | Fox |
| 8,083,184 | B2 | 12/2011 | Fox |
| 2004/0108416 | A1 | 6/2004 | Parkinson |
| 2005/0230555 | A1 | 10/2005 | Strong |
| 2008/0017754 | A1 | 1/2008 | Taylor |
| 2008/0149775 | A1 | 6/2008 | Dunker et al. |
| 2008/0283669 | A1 | 11/2008 | Hansson et al. |

OTHER PUBLICATIONS

Notice of Allowance dated Jul. 22, 2010 for U.S. Appl. No. 12/535,099.
Office Action dated Jul. 22, 2010 for U.S. Appl. No. 12/535,099.
Restriction Requirement dated Dec. 20, 2010 for U.S. Appl. No. 12/576,604.
Restriction Requirement dated Jan. 21, 2011 for U.S. Appl. No. 12/698,289.
Restriction Requirement dated Jan. 21, 2011 for U.S. Appl. No. 12/481,356.
Office Action dated Jan. 10, 2011 for U.S. Appl. No. 12/535,099.
Office Action dated Jan. 31, 2011 for U.S. Appl. No. 12/576,604.
Restriction Requirement dated Feb. 7, 2011 for U.S. Appl. No. 12/750,921.
Office Action dated Jun. 8, 2011 for U.S. Appl. No. 12/750,921.
Final Office Action dated Oct. 18, 2011 for U.S. Appl. No. 12/750,921.
Notice of Allowance dated Oct. 11, 2011 for U.S. Appl. No. 12/535,099.
Notice of Allowance dated May 12, 2011 for U.S. Appl. No. 12/576,604.
Notice of Allowance dated Sep. 1, 2011 for U.S. Appl. No. 12/481,356.
Notice of Allowance dated Apr. 18, 2011 for U.S. Appl. No. 12/698,289.

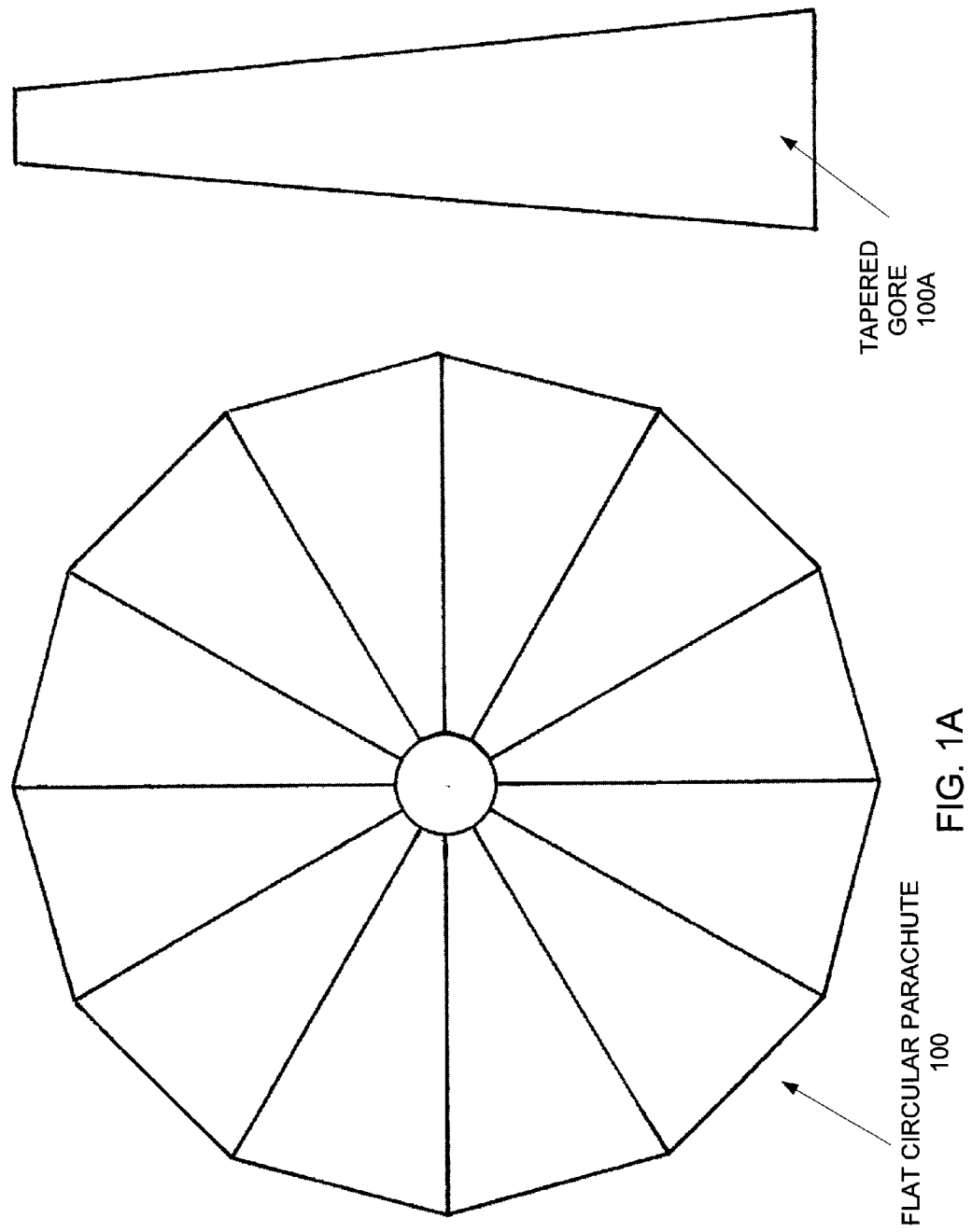

(SIDE VIEW)

(BOTTOM VIEW)

(BOTTOM VIEW)

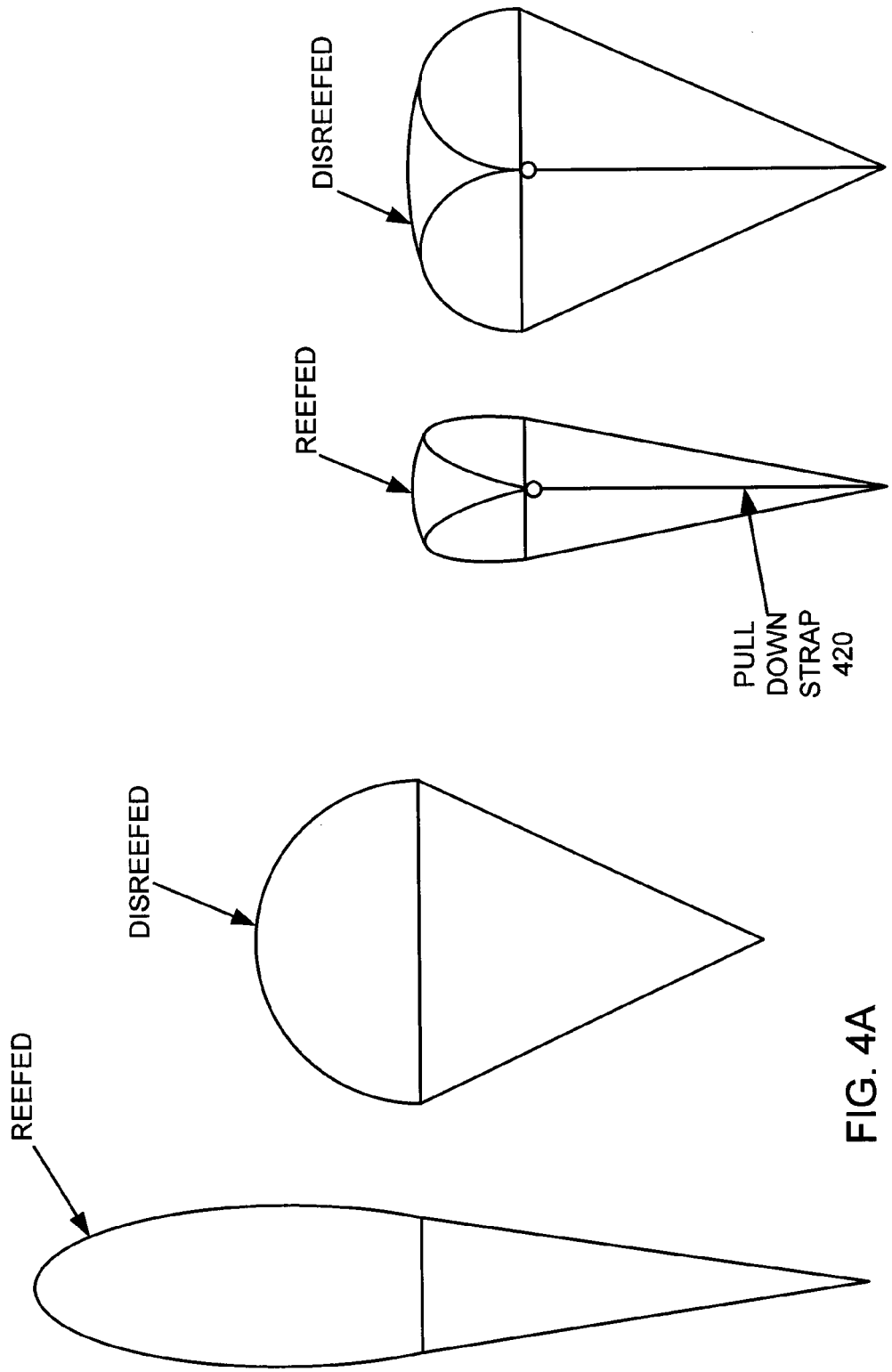

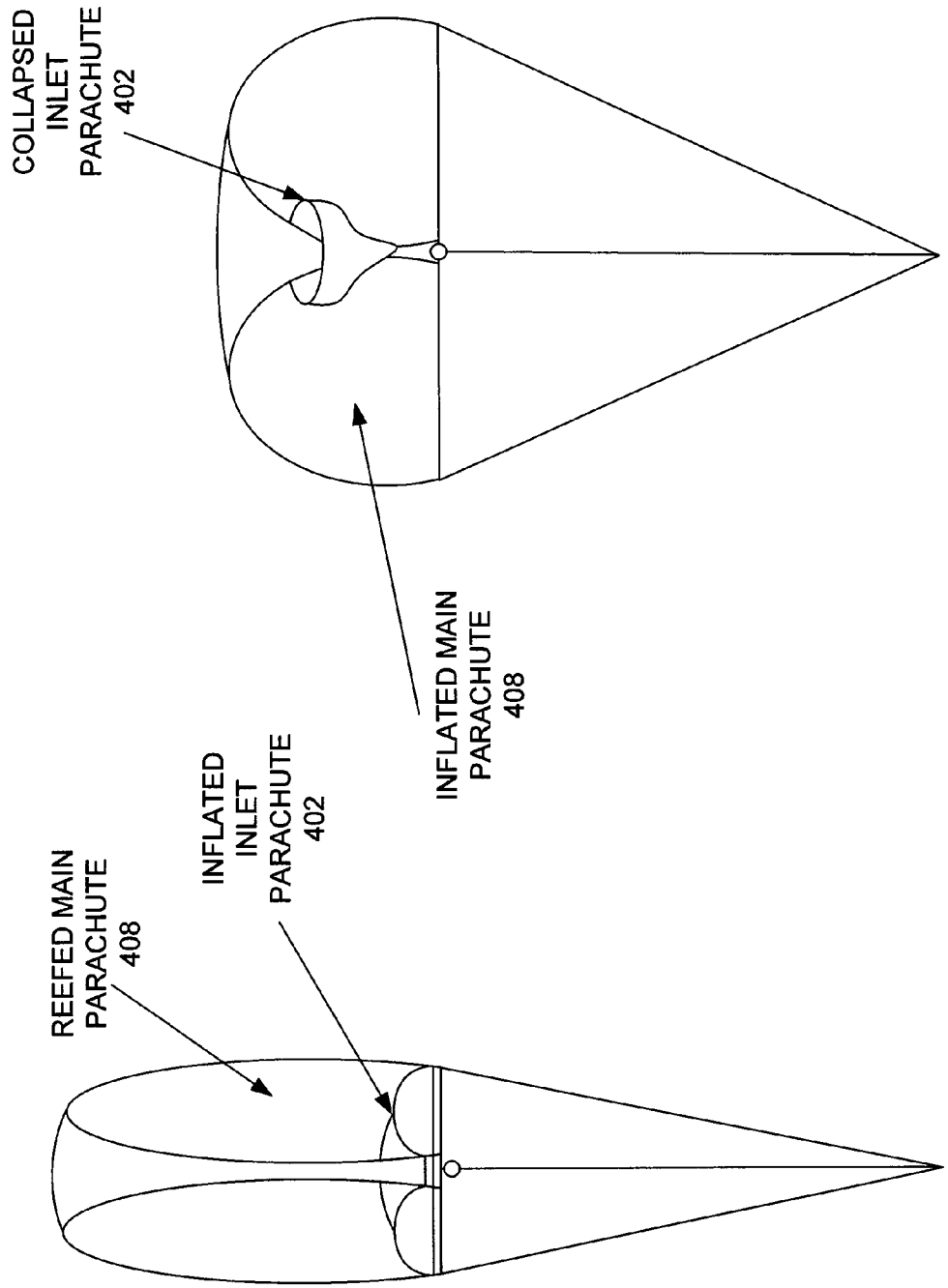

PARACHUTE INLET CONTROL SYSTEM AND METHOD

CROSS REFERENCE TO RELATED APPLICATIONS

This application is a continuation of U.S. Ser. No. 12/535,099 filed on Aug. 4, 2009, now U.S. Pat. No. 8,096,509 entitled "PARACHUTE INLET CONTROL SYSTEM AND METHOD". U.S. Ser. No. 12/535,099 claims priority to and is a non-provisional of U.S. Provisional No. 61/086,959 filed on Aug. 7, 2008 and entitled "PARACHUTE INLET CONTROL SYSTEM." The entire contents of each of the foregoing applications are hereby incorporated by reference.

TECHNICAL FIELD

The present disclosure relates to parachutes, and more particularly to large-scale parachutes deployed solo or in clusters to support heavy and/or bulky payloads.

BACKGROUND

Large cargo parachutes are typically constructed to have a flat disc canopy of approximately 100 feet in diameter, although some are smaller and a few are larger. A 100 foot diameter cargo parachute may typically be used for recovering an aerial delivered payload having a weight range from approximately 2,500 pounds to 5,000 pounds. Payloads of less than approximately 2,500 pounds would most often use a cargo parachute having a smaller diameter. If the payload weight is between approximately 5,000 pounds and 10,000 pounds, another 100 foot diameter parachute is typically added beside the original parachute. The resulting arrangement is known as a 2-chute cluster. Similarly, payload weights of between approximately 10,000 pounds and 15,000 pounds typically use three 100 foot diameter parachutes as a 3-chute cluster. Further, each approximately 5,000 pound payload weight increase typically requires an additional 100 foot diameter parachute.

The initial inflation phase of parachute deployment is typically quite dynamic and somewhat chaotic. Therefore, a typical 2-chute parachute cluster will have more inflation difficulties than will a single parachute, and each additional parachute added to a cluster further increases the potential for a parachute to fail. Because of these issues, a parachute cluster having more than eight 100 foot diameter parachutes is extremely unusual. Primarily, the problems begin with what are referred to as "leading" and/or "lagging" parachutes.

If one of the parachutes in a cluster is slow to initially ingest air (a "lagging" parachute), other inflating parachutes may block its air inlet area and it may not inflate at all. If one or more parachutes in a cluster fail to inflate, the rate of descent for the payload will be higher than desired. The payload may be damaged or destroyed at landing.

Conversely, if one parachute in a cluster of parachutes ingests air in advance of the others within a cluster (a "leading" parachute), it may become overloaded and rupture. If another parachute then leads, it too may overload and rupture. A chain reaction may follow until all parachutes in the cluster have catastrophically failed.

In an attempt to minimize these and other parachute inflation problems, large cargo parachutes are typically equipped with a "reefing" system to provide some control to the initial parachute inflation stage. A typical reefing system consists of a series of reefing rings attached circumferentially around the periphery of the parachute canopy, a reefing line, and a reefing line cutter. The reefing line is passed through the reefing rings, and prevents the parachute canopy from opening fully. Therefore, this conventional reefing system is somewhat analogous to a set of trouser belt loops, having a belt sequentially threaded through them, with the belt tightly cinched until the reefing line cutter severs it. Once the reefing line is severed, the parachute is no longer restrained by the reefing line and the parachute is permitted to fully inflate. Even with a reefing system, however, initial inflation of individual parachutes in a parachute cluster is somewhat random, and many parachute failures still occur.

Additionally, typical aerial delivery operations occur at relatively low altitudes. Therefore, reefing line cutters having short delays, such as 2.5 seconds, are typically used. But, within a particular cluster of parachutes, these relatively short reefing times often do not provide a sufficient time interval for the reefing systems to provide optimal control of the individual parachute canopy air inlets before the reefing cutters sever their reefing lines. Delaying the disreefing event, for example by incorporating longer delay reefing cutters, may allow more time for the individual reefing systems to provide better initial parachute inflation control, but may also allow the payload to reach the ground surface before full inflation of the parachutes can occur. Therefore, while longer reefing times may improve the success rate of some aerial delivery systems, the altitude from which the aerial delivery operation occurs must be increased to allow more reefing time. This is generally an undesirable option, because most aerial delivery operations are conducted as part of larger military operations. Thus, factors other than parachute reefing times play a significant role in selecting the preferred aerial delivery altitude.

Therefore, it remains desirable to achieve a greater degree of control over the inflation process for solo and/or clustered parachutes, for example parachutes utilized for aerial delivery operations.

SUMMARY

A parachute inlet control system and methods for use are disclosed. In an exemplary embodiment, a parachute inlet control system for facilitating controlled inflation of a main parachute comprises a parachute component comprising an inlet parachute, a reefing component comprising a plurality of lacing loops configured to couple the inlet parachute to a main parachute, and a release component comprising a reefing cutter configured to separate the inlet parachute from the main parachute.

In another exemplary embodiment, a method for inflating a parachute comprises providing an inlet parachute, and coupling the inlet parachute to a main parachute. The inlet parachute is configured to inflate within the inlet area of the main parachute.

In another exemplary embodiment, a method for controlling operation of a parachute cluster comprises coupling at least two main parachutes to form a parachute cluster, coupling a parachute inlet control system to each main parachute in the parachute cluster, and deploying the parachute cluster to support a payload. Each parachute inlet control system is activated to cause the inlet area of each main parachute to assume a desired shape. A reefing cutter associated with each parachute inlet control system is activated to allow each main parachute in the parachute cluster to further inflate.

In another exemplary embodiment, a tangible computer-readable medium has stored thereon, computer-executable instructions that, if executed by a system, cause the system to perform a method. The method comprises activating a reefing cutter to cause an inlet parachute to separate from the skirt of a main parachute. The inlet parachute is inflated in the inlet area of the main parachute, and the inlet parachute is coupled to the main parachute via a plurality of lacing loops threaded through reefing rings located on the skirt of the main parachute.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 1A illustrates a bottom view of a flat circular parachute;

FIG. 4A illustrates a main parachute in a reefed and disreefed condition in accordance with an exemplary embodiment;

FIG. 4B illustrates a main parachute having a pulled down vent configuration in a reefed and disreefed condition in accordance with an exemplary embodiment;

FIG. 4C illustrates a main parachute having a pulled down vent configuration, and an inflated inlet parachute in the main vent thereof in accordance with an exemplary embodiment;

FIG. 4D illustrates a main parachute having a pulled down vent configuration, and an inlet parachute coupled thereto after a parachute inlet control system has ceased to function as a reefing means in accordance with an exemplary embodiment;

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for parachute construction, grouping, deployment, recovery, reefing, disreefing, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical parachute inlet control system.

Primarily because of construction costs, a common generally circular parachute type is constructed as a polygon, but is known as a flat circular parachute, and is typically constructed from tapered gores 100A forming a flat-disc parachute canopy, as depicted by FIG. 1A. The flat circular parachute 100 canopy has an inflated diameter that is about two-thirds (⅔) of its constructed diameter. However, during initial inflation, flat circular parachute 100 can momentarily "overinflate" and nearly reach its flat-disc constructed diameter if the parachute is not reefed. This is undesirable, because very high forces are developed during such an over-inflation occurrence. The parachute in question may fail under the high forces. Additionally, the payload may be damaged or disturbed.

Figure 1B:
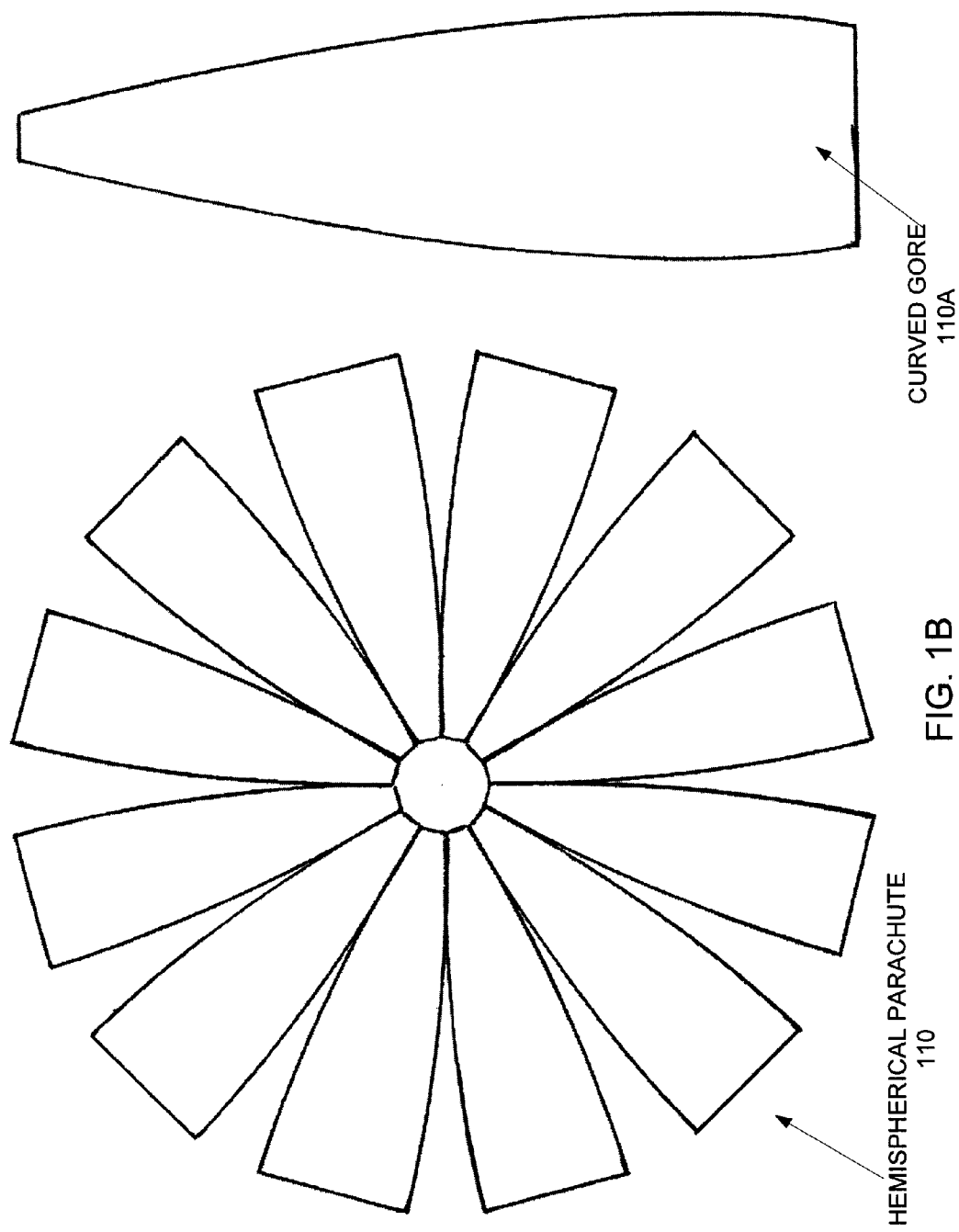
FIG. 1B illustrates a hemispherical parachute.

Turning to FIG. 1B, a generally hemispherical parachute canopy, such as the canopy of hemispherical parachute 110, may be constructed with known gore-shaping components, for example via use of curved gores 110A. Hemispherical parachute 110 typically has a constructed diameter which is nearly equal to its inflated diameter. While a hemispherical parachute is less prone to over-inflation than a flat circular parachute, a hemispherical parachute may still overinflate, and may also still become a leading and/or a lagging parachute when deployed in a parachute cluster.

Figure 1C:
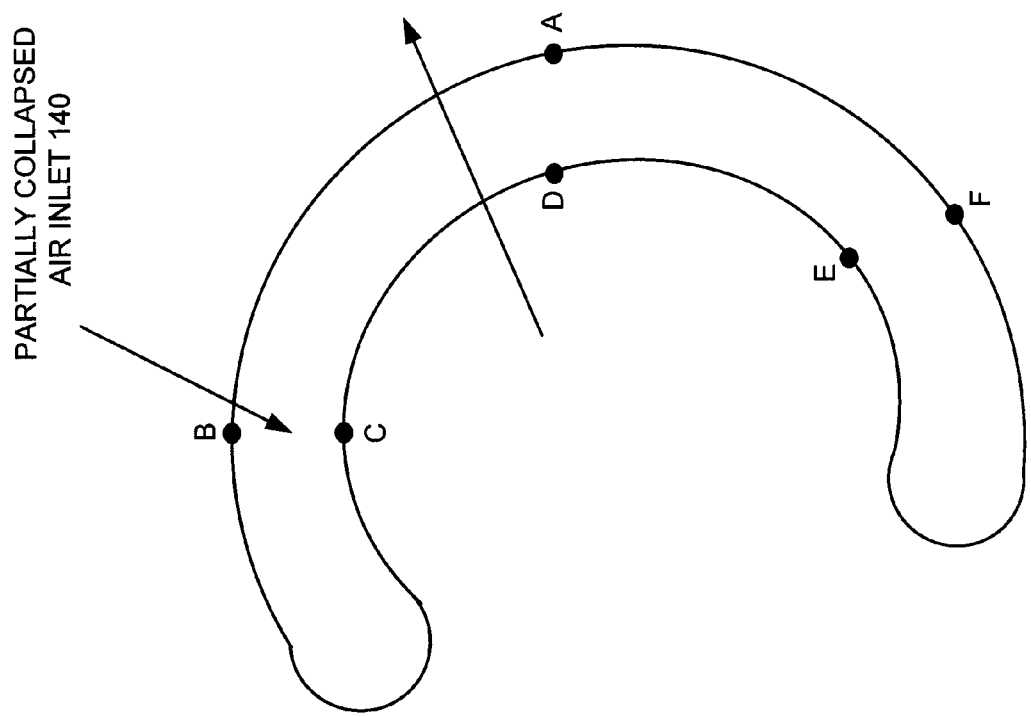
FIG. 1C illustrates various parachute air inlet shapes.
Figure 1C:
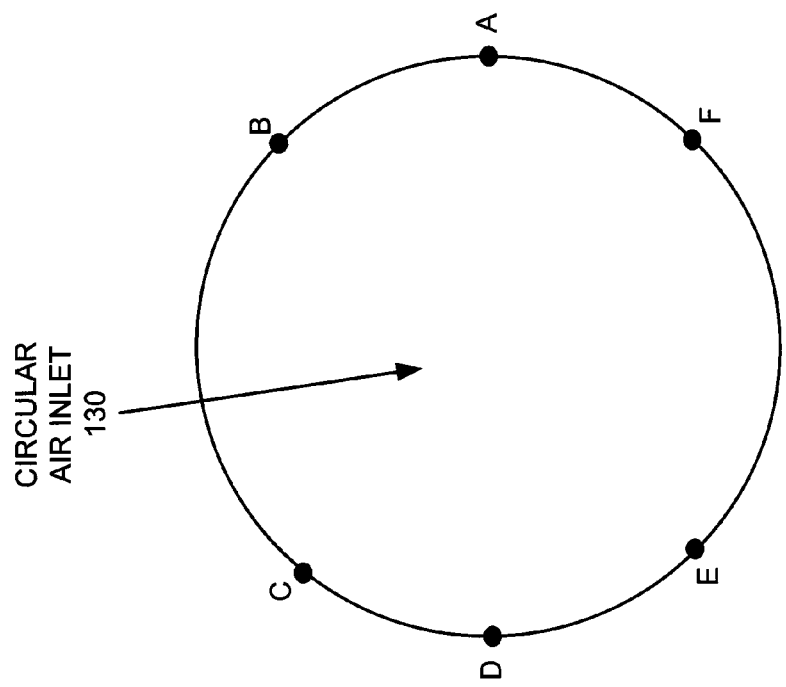

With reference now to FIG. 1C, a substantially circular parachute air inlet 130 is presented. Suspension line attachment points A-F are shown around the periphery of inlet 130. Due to the somewhat chaotic conditions associated with the initial deployment of a parachute, before the parachute canopy skirt has become taut, a portion of the periphery of an air inlet may partially or fully traverse a desired circular air inlet area, as illustrated by partially collapsed air inlet 140. If a portion of the periphery of partially collapsed air inlet 140 passes between suspension lines on another portion of the periphery of partially collapsed air inlet 140 (for example, if suspension line attachment point C and/or D on partially collapsed air inlet 140 passes between suspension line attachment points A and B, as illustrated by the directional arrow in FIG. 1C), a portion of the main parachute canopy may then inflate outside what should be the parachute canopy periphery. This typically results in a parachute malfunction known as a "Mae West."

Figure 1D:
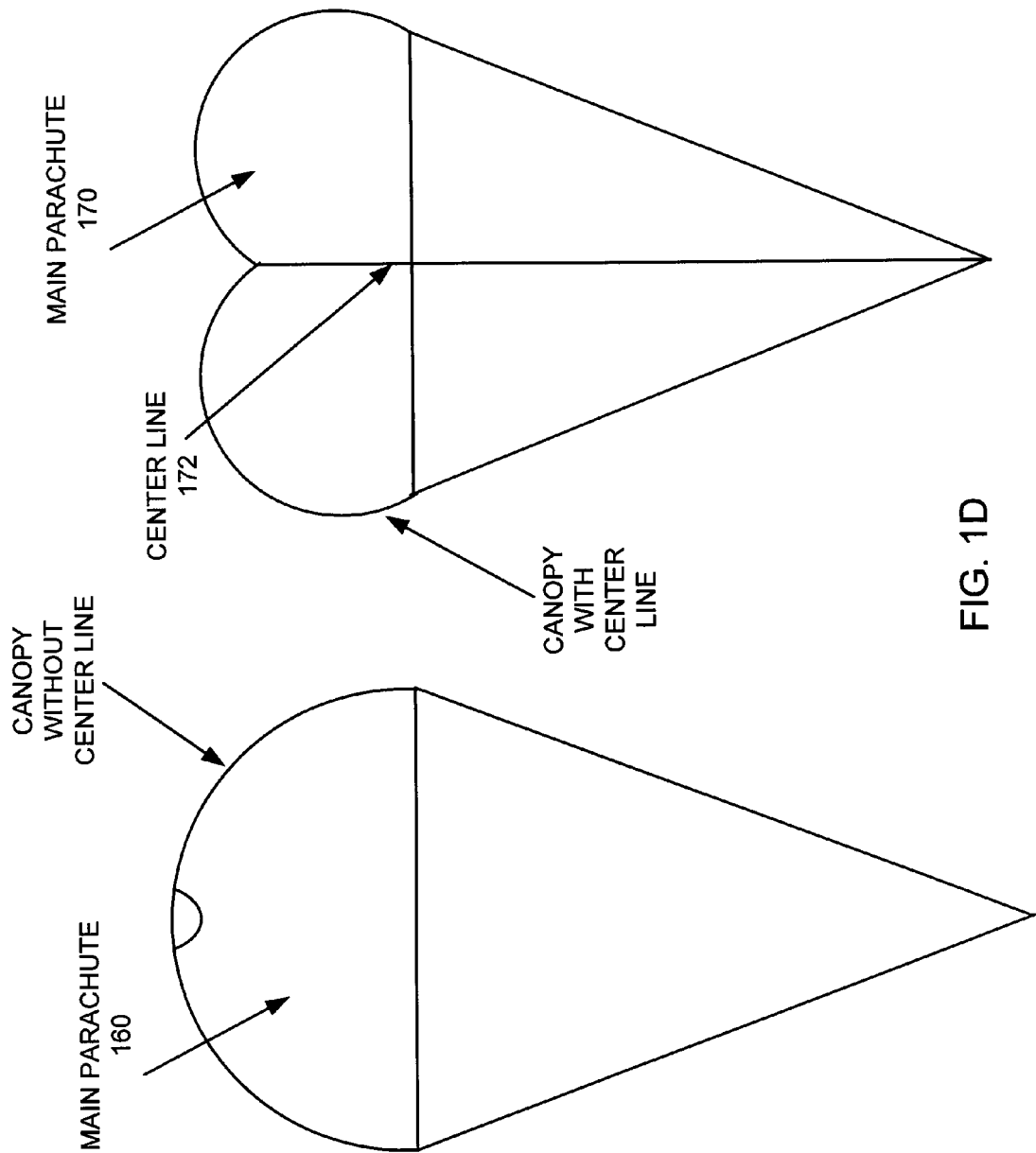
FIG. 1D illustrates a side view of a main parachute with and without a center line.

Turning now to FIG. 1D, a parachute, such as main parachute 160, may have suspension lines attached only at the edges of the parachute canopy. However, a parachute, such as main parachute 170, may have a strap or line, such as center line 172, extending from the parachute canopy apex to a point below the parachute canopy, for example a suspension line convergence point. Typically, the length of center line 172 is only somewhat longer than the peripheral suspension lines, so that center line 172 will pull the inflated canopy apex down toward the general elevation of the canopy skirt. This configuration causes the canopy to form a shape somewhat resembling a "split bagel" or partial torus. When the parachute apex is pulled downward, the parachute canopy may bulge outward more than it otherwise would, and thus the projected area of the parachute is increased. Additionally, a center-lined parachute canopy shape may be less aerodynamically streamlined, with a corresponding increase in drag.

Figure 1E:
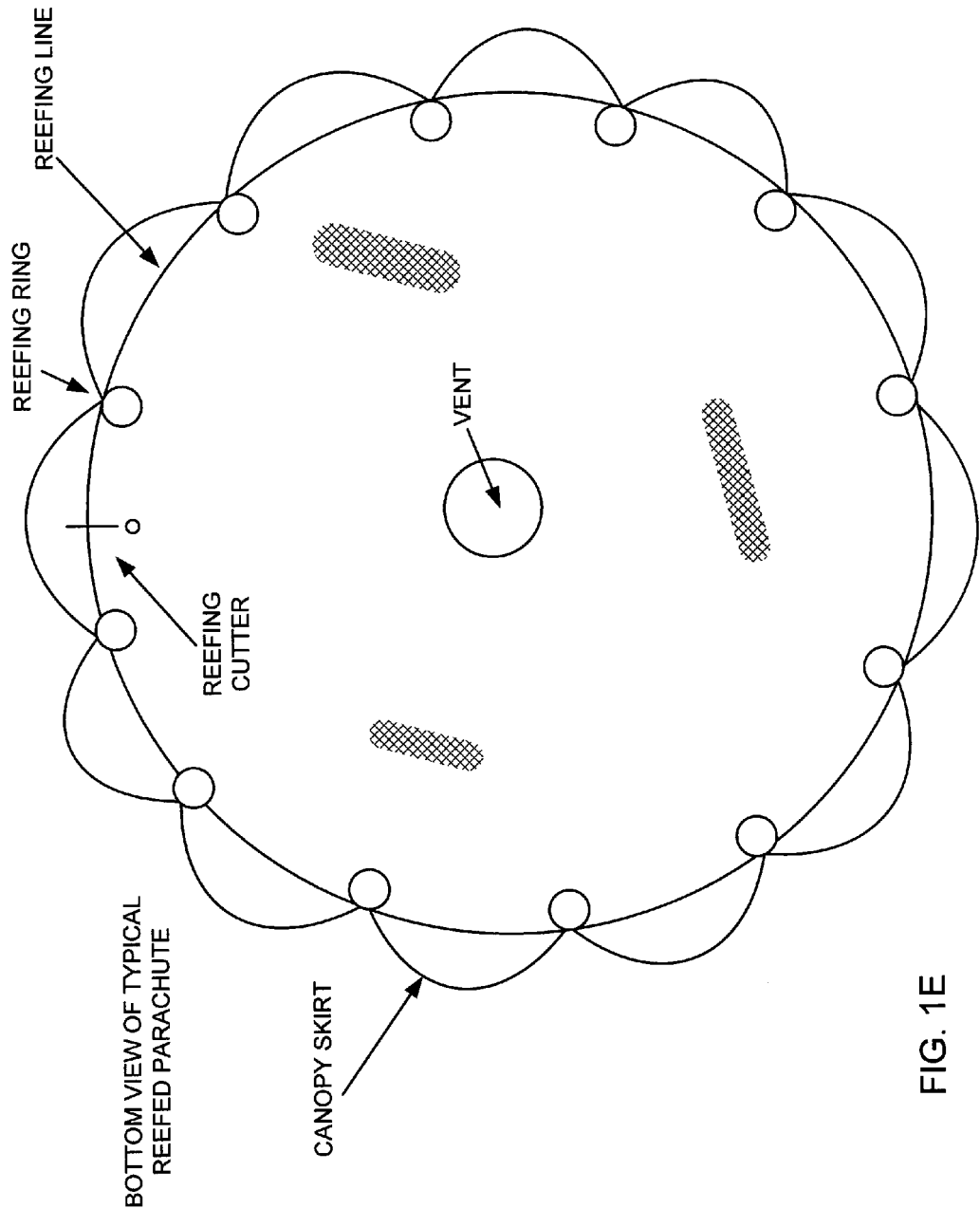
FIG. 1E illustrates a bottom view of a reefed parachute.

Additionally, to help a parachute inflate in a controlled manner, a reefing system may be used. A reefing system restricts the inlet size of a parachute, and thus prevents the parachute from fully inflating until the reefing system is released. FIG. 1E depicts a bottom view of a typical circular main parachute having a typical reefing line, typical reefing rings, and typical reefing line cutter. One goal of a conventional reefing system is prevention of a leading parachute within a parachute cluster. However, conventional reefing systems are inefficient at this task if they do not maintain control of the parachute canopy inlet long enough for each canopy in a parachute cluster to form a symmetrical, fully reefed shape. Moreover, conventional reefing systems have no means to encourage a lagging parachute to catch up to any other parachute in the parachute cluster. Accordingly, a parachute inlet control system may be provided in order to control, guide, and/or otherwise influence inflation, reefing, and/or disreefing of one or more main parachutes.

A parachute inlet control system may be any system configured to facilitate controlled inflation, reefing, and/or disreefing of a main parachute. In accordance with an exemplary embodiment, and with reference to FIG. 1F, a parachute inlet control system 101 generally comprises a parachute component 101A, a reefing component 101B, and a release component 101C. Parachute component 101A is configured to provide a force to inflate, shape, and/or otherwise facilitate, control, and/or guide opening of the intake vent of a main parachute. Reefing component 101B is coupled to parachute component 101A, and is configured to restrict the opening of the intake vent of a main parachute beyond a desired point (for example, beyond a desired intake vent diameter, size and/or area). Release component 101C is coupled to parachute component 101A and/or reefing component 101B, and is configured to sever, cut, and/or otherwise facilitate at least partial separation of parachute inlet control system 101 from a main parachute.

Figure 1F:
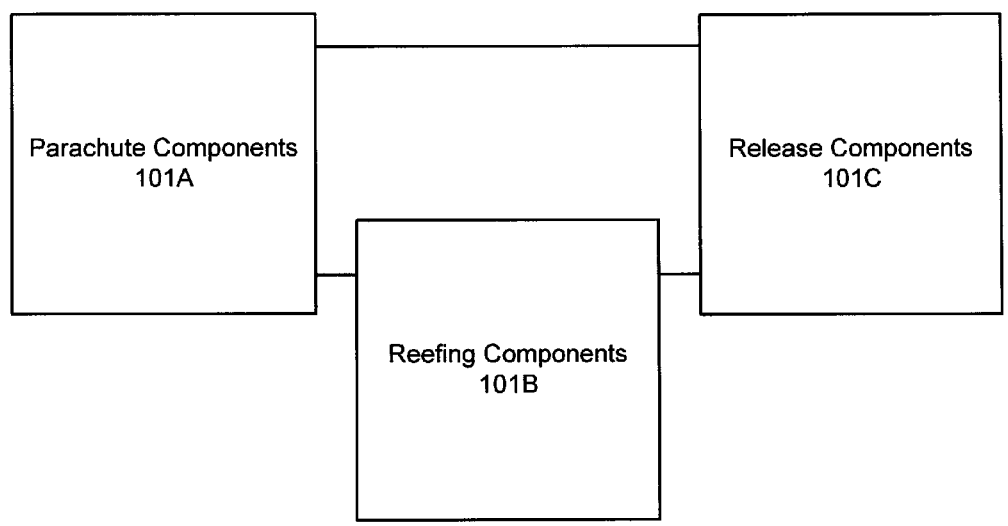
FIG. 1F illustrates a block diagram of a parachute inlet control system in accordance with an exemplary embodiment.

Through use of a parachute inlet control system, such as parachute inlet control system 101 in FIG. 1F, various shortcomings of conventional parachutes and parachute clusters may be overcome. Leading and lagging parachutes may be reduced and/or eliminated. Over-inflation of circular parachutes may be prevented. "Mae West" malfunctions and other parachute inlet anomalies may be reduced and/or prevented. Additionally, parachute inlet control system 101 may be configured to enable these benefits for main parachutes lacking a center line, as well as for main parachutes having a center line.

Figure 2A:
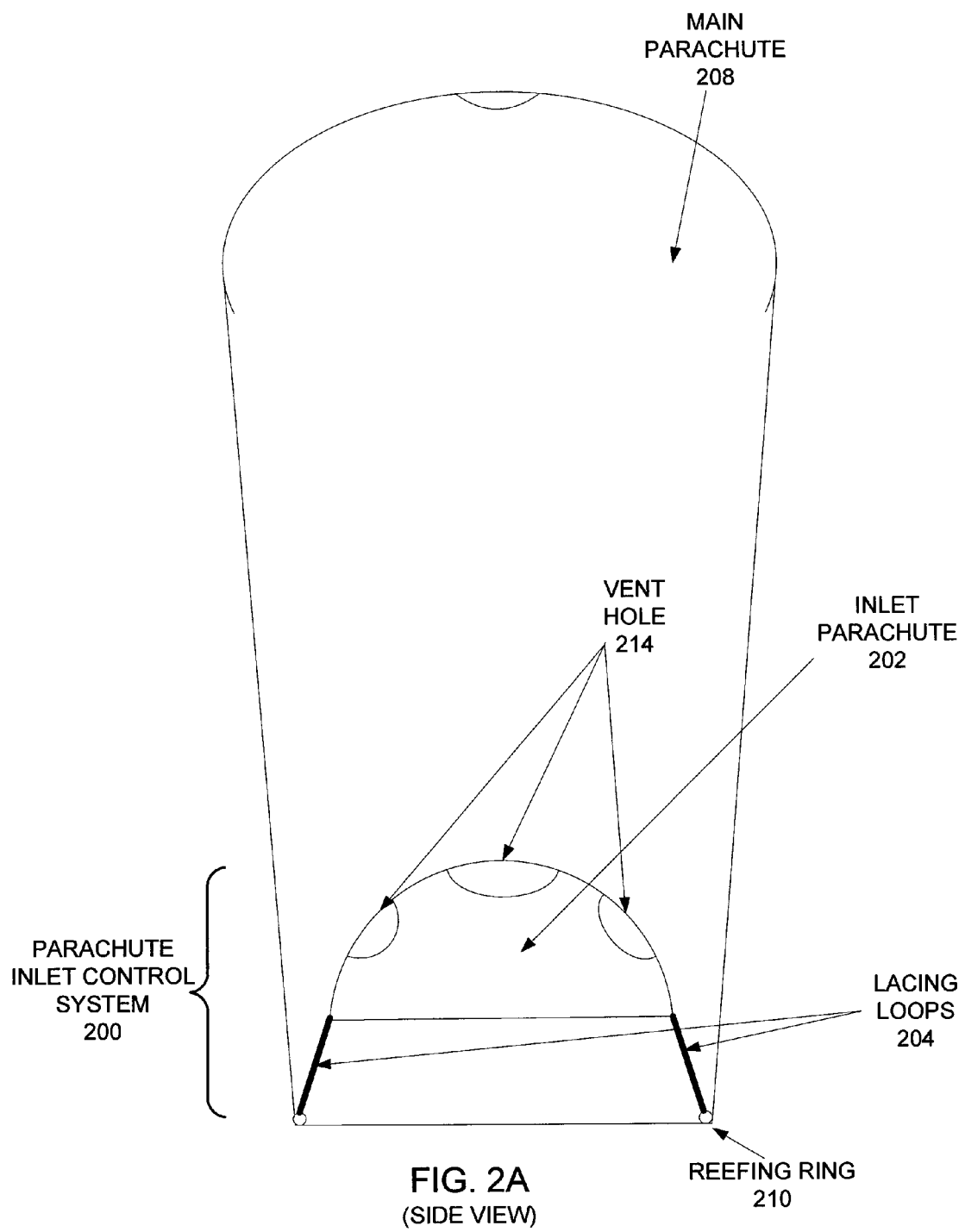
FIG. 2A illustrates a side view of a main parachute coupled to an inlet parachute in accordance with an exemplary embodiment.
Figure 2B:
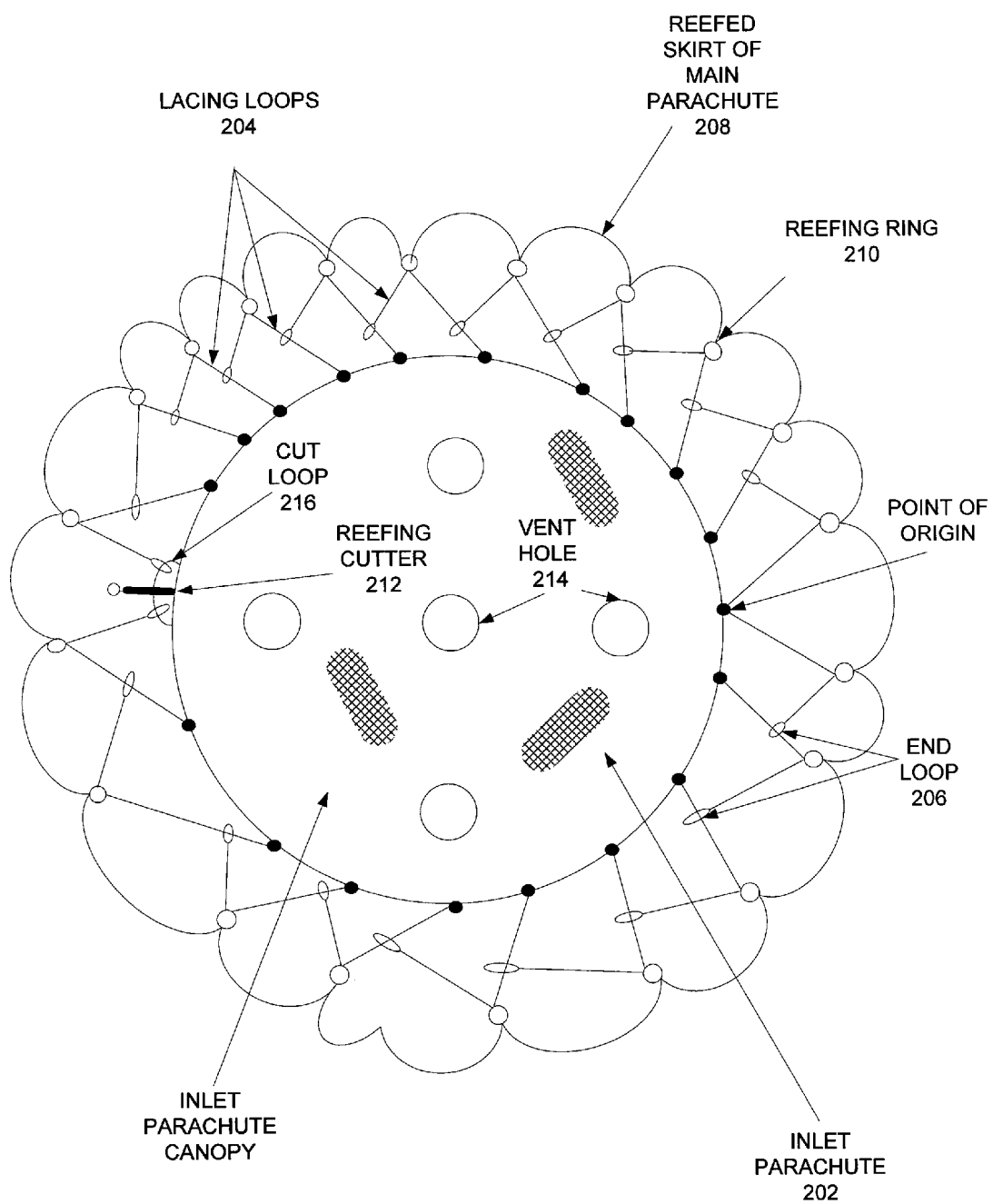
FIG. 2B illustrates a bottom view of an inlet parachute installed in the air inlet area of a main parachute having a single lacing loop for each main parachute reefing ring in accordance with an exemplary embodiment.
Figure 2C:
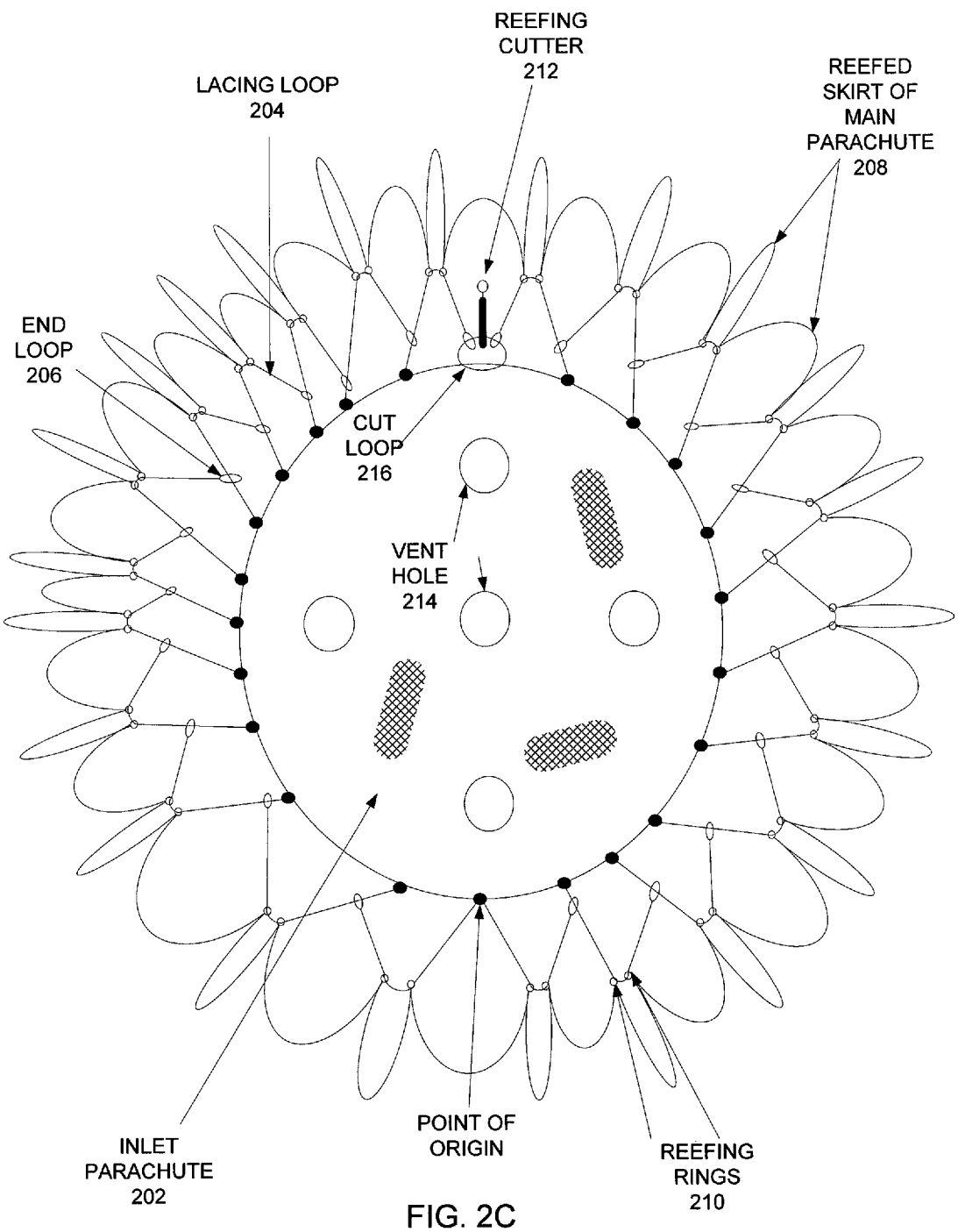
FIG. 2C illustrates a bottom view of an inlet parachute installed in the inlet area of a main parachute having a single lacing loop for each two main parachute reefing rings in accordance with an exemplary embodiment.

With reference now to FIGS. 2A-2C, and in accordance with an exemplary embodiment, a parachute inlet control system 101 (for example, parachute inlet control system 200) comprises inlet parachute 202, a plurality of lacing loops 204 each having an end loop 206, and at least one reefing cutter 212. Inlet parachute 202 may also comprise one or more vent holes 214. A plurality of reefing rings 210 are provided on a main parachute 208, as depicted in FIG. 2A. Parachute inlet control system 200 is coupled to main parachute 208 at reefing rings 210. Alternatively, parachute inlet control system 200 may be coupled to main parachute 208 at locations other than reefing rings 210, for example at suspension lines of main parachute 208.

Inlet parachute 202 may comprise any component, structure, materials, and/or mechanisms configured to apply a force to an inlet vent of a main parachute. In accordance with an exemplary embodiment, inlet parachute 202 comprises a hemispherical parachute. In another exemplary embodiment, inlet parachute 202 comprises a semispherical cruciform parachute, for example a parachute disclosed in U.S. Pat. No. 7,261,258 to Fox. Moreover, inlet parachute 202 may comprise any suitable parachute configured to inflate in the inlet area of main parachute 208.

In an exemplary embodiment, inlet parachute 202 comprises nylon fabric. Additionally, inlet parachute 202 may comprise polyethylene terephthalate (e.g., Dacron®), ultra-high molecular weight polyethelyne (e.g., Spectra®), poly paraphenylene terephthalamide (e.g., Kevlar®), and/or other high-modulus aramid fibers, and the like. For example, inlet parachute 202 may comprise nylon gores coupled to Kevlar® fabric reinforcing portions in various locations. Moreover, inlet parachute 202 may comprise any suitable material or combination of materials configured to inflate in response to movement through an air stream.

Further, inlet parachute 202 may also comprise one or more vent holes 214. In an exemplary embodiment, a vent hole 214 is located in the center of inlet parachute 202. Moreover, one or more vent holes 214 may be located at any suitable location on inlet parachute 202 in order to facilitate operation of inlet parachute 202, as desired.

In an exemplary embodiment, inlet parachute 202 is coupled to reefing rings 210 via lacing loops 204. Moreover, inlet parachute 202 may be coupled to main parachute 208 via any suitable mechanism and/or at any suitable location configured to cause the inlet area of main parachute 208 to expand to and/or assume a desired shape.

In accordance with an exemplary embodiment, inlet parachute 202 is coupled to main parachute 208 via a tether line. The tether line prevents inlet parachute 202 from drifting away from main parachute 208 after reefing cutter 212 has functioned. In this manner, inlet parachute 202 may be more easily recovered and/or reused. In various exemplary embodiments, a center line, such as center line 304 depicted in FIG. 3, may tether inlet parachute 202 to main parachute 208.

In accordance with various exemplary embodiments, inlet parachute 202 may be customized for use with a particular main parachute and/or payload. For example, inlet parachute 202's size, shape, configuration, material, vent size, vent location, and/or the like may be configured based on a desired inflation time for main parachute 208. Moreover, inlet parachute 202 may be configured based on any suitable criteria as determined by a user, for example payload size, payload weight, deployment velocity, inlet size of main parachute 208, and/or the like.

Lacing loops 204 may comprise any suitable material, fabric, rope, cord, and/or the like, configured to releasably couple inlet parachute 202 and main parachute 208. In accordance with an exemplary embodiment, lacing loops 204 comprise high-strength cord coupled to inlet parachute 202 and reefing rings 210. In various exemplary embodiments, lacing loops 204 comprise Spectra® fiber. In other exemplary embodiments, lacing loops 204 comprise Kevlar® fiber. In various exemplary embodiments, lacing loops 204 are configured to have a length of between approximately 10% and 50% of the diameter of inlet parachute 202. In another exemplary embodiment, lacing loops 204 are configured to have a length of approximately 20% of the diameter of inlet parachute 202. Moreover, lacing loops 204 may comprise any suitable configuration, shape, length, thickness, mass, density, and/or material configured to couple parachute 202 to main parachute 208 and/or reefing rings 210.

In accordance with an exemplary embodiment, each lacing loop 204 comprises an end loop 206, as depicted in FIG. 2B. When parachute inlet control system 200 is coupled to main parachute 208, each lacing loop 204 is passed through end loop 206 of an adjoining lacing loop 204. In this manner, inlet parachute 202 may be secured to main parachute 208 and/or reefing rings 210 in a stable configuration. Additionally, in this manner inlet parachute 202 may be rapidly separated from main parachute 208 and/or reefing rings 210 responsive to function of a reefing cutter, for example reefing cutter 212 as depicted in FIG. 2B.

With reference now to FIGS. 2A and 2B, and in an exemplary embodiment, lacing loops 204 are sequentially threaded through reefing rings 210 of main parachute 208. Additionally, each lacing loop 204 is sequentially threaded through end loop 206 of an adjoining lacing loop 204. This may be accomplished by selecting a location on the edge of inlet parachute 202 as a point of origin. From this point of origin, lacing loops 204 and reefing rings 210 are threaded in a sequential manner clockwise from the point of origin. Similarly, lacing loops 204 and reefing rings 210 are threaded in a sequential manner counterclockwise from the point of origin. Thus, two lacing loops 204 are coupled to the edge of inlet parachute 202 at the point of origin.

In this manner, lacing loops 204 and reefing rings 210 are threaded together around the inlet perimeter of main parachute 208. In an exemplary embodiment, the counterclockwise threaded portion and the clockwise threaded portion are of equal length, and thus meet up at a location on the edge of inlet parachute 202 directly across from the point of origin. In various other exemplary embodiments, the clockwise threaded portion and the counterclockwise threaded portion have unequal lengths. When the two threaded portions meet, the final two lacing loops 204 are coupled to each other and to the periphery of inlet parachute 202 with a cut loop 216. Cut loop 216 is configured to be severed via operation of reefing cutter 212.

The foregoing illustration illustrates use of a single point of origin, a single cut loop, and a single reefing cutter. However, multiple points of origin, clockwise and/or counterclockwise threaded portions, cut loops, and reefing cutters may also be used. In these exemplary embodiments, one or more disreefing events may occur if desired.

Reefing rings 210 may comprise any suitable structure, material, shape, size, and/or configuration to facilitate coupling a main parachute 208 to an inlet parachute 202. Continuing to reference FIG. 2B, and in accordance with an exemplary embodiment, a plurality of reefing rings 210 are coupled to main parachute 208 around the periphery of the main parachute 208 air inlet. Reefing rings 210 may comprise metal (e.g., aluminum, steel, titanium, magnesium, and the like, and/or alloys and combinations of the same), plastic, composite, textile, or any other suitable material configured to couple with lacing loops 204. Reefing rings 210 may be located in any suitable location on main parachute 208. For example, a reefing ring 210 may be located on the canopy skirt of main parachute 208 at the junction of each radial seam, and/or between adjacent gores and a suspension line. In an exemplary embodiment, one reefing ring 210 is provided for each gore of main parachute 208. In another exemplary embodiment, two reefing rings 210 are provided for each gore of main parachute 208. Moreover, any suitable number of reefing rings 210 may be coupled to main parachute 208 in order to facilitate coupling of main parachute 208 to inlet parachute 202 and/or to control the inflation of main parachute 208.

In various exemplary embodiments, lacing loops 204 are threaded through reefing rings 210. With continued reference to FIG. 2B, and in an exemplary embodiment, one lacing loop 204 is threaded through one reefing ring 210. With reference now to FIG. 2C, and in another exemplary embodiment, one lacing loop 204 is threaded through two reefing rings 210. Moreover, one lacing loop 204 may be passed through any suitable number of reefing rings 210 in order to achieve a desired inflation profile for main parachute 208. Additionally, multiple lacing loops 204 may be passed through a single reefing ring 210.

Main parachute 208 may comprise any suitable material or combination of material in any suitable configuration to slow the descent of a desired payload. In accordance with an exemplary embodiment, main parachute 208 is configured to slow the descent of a payload through the atmosphere. In various exemplary embodiments, main parachute 208 may be a flat circular parachute, a hemispherical parachute, a cruciform parachute, and the like. Main parachute 208 may be deployed alone, or may be part of a parachute cluster. Moreover, main parachute 208 may be configured with any suitable components to enable use with parachute inlet control system 200, as desired. Main parachute 208 is further configured to inflate responsive to operation of one or more reefing cutters 212.

Reefing cutter 212 may comprise any suitable mechanism configured to facilitate at least partial separation of inlet parachute 202 and main parachute 208, for example by severing cut loop 216. In accordance with an exemplary embodiment, reefing cutter 212 comprises a pyrotechnic charge configured to force a blade through a cord. In accordance with various exemplary embodiments, reefing cutter 212 is configured to sever cut loop 216 between approximately 1.5 seconds and 5 seconds after main parachute 208 is deployed. In another exemplary embodiment, reefing cutter 212 is configured to sever cut loop 216 2.5 seconds after main parachute 208 is deployed. Moreover, reefing cutter 212 may be configured to sever cut loop 216 at any suitable time configured to facilitate a desired inflation profile for main parachute 208, and the examples provided herein are for way of illustration and not of limitation.

Additionally, reefing cutter 212 may be configured for remote operation. For example, reefing cutter 212 may be configured with wireless communication components allowing a user to send an operative command, for example an activation command, to reefing cutter 212 and/or other components of parachute inlet control system 200. In this manner, a user may monitor the inflation of a main parachute 208, and may trigger operation of reefing cutter 212 once a desired inflation profile for main parachute 208 has been achieved. Additionally, a user may monitor the inflation of multiple main parachutes 208 configured as a parachute cluster, and may trigger operation of one or more reefing cutters 212 at a desired time, for example once all main parachutes 208 in the parachute cluster have achieved a desired inflation profile. Reefing cutter 212 may also be configured to activate after a predetermined time period (for example, 10 seconds) if an operative command has not been received. Reefing cutter 212 may further be configured to be activated responsive to any suitable condition, for example altitude of a payload, velocity of a payload, atmospheric pressure, temperature, and/or the like, as desired.

Continuing to reference FIGS. 2A-2C, and in accordance with various exemplary embodiments, parachute canopies generally inflate by allowing air to enter the bottom of the parachute canopy. The air is then trapped inside the canopy, forming a bubble at the parachute top that grows larger and larger, inflating and pressurizing the parachute canopy from top to bottom. Thus, at least partially blocking the air inlet into the canopy of a parachute, for example main parachute 208, by coupling an inlet parachute 202 in this area may seem to be the exact opposite of what is needed to encourage a speedy reefed inflation of main parachute 208. However, small parachutes, such as inlet parachute 202, inflate much more rapidly than large parachutes. Therefore, a small parachute strategically positioned inside the air inlet of main parachute 208 can rapidly inflate and quickly force the air inlet of main parachute 208 into a desirable shape. This is especially true if inlet parachute 202 is constructed of low permeability fabric. Moreover, because lacing loops 204 on inlet parachute 202 allow the inlet of main parachute 208 to spread to a somewhat larger diameter than that of inlet parachute 202, high velocity air flows around inlet parachute 202 and fills main parachute 208.

Additionally, the canopy of inlet parachute 202 can be equipped with one or more vent holes 214 configured to flow air therethrough and into the canopy of main parachute 208. Thus, inlet parachute 202 does not block air flow into main parachute 208, because inlet parachute 202 rapidly becomes centered in the inlet of main parachute 208, and thus at least partially controls, guides, and/or directs air flow into main parachute 208. Because the perpendicular component of the air flow around inlet parachute 202 rapidly forces the skirt of main parachute 208 into a desirable shape, main parachute 208 becomes configured to ingest air more uniformly, and thus more rapidly, with inlet parachute 202 in place than without inlet parachute 202 in place. Further, such an approach is very effective in preventing lagging main parachutes in a parachute cluster. In a parachute cluster having main parachutes equipped with parachute inlet control system 200, such as that depicted in FIG. 2A, each main parachute canopy air inlet rapidly forms a desirable shape almost simultaneously.

Further, because lacing loops 204 of inlet parachute 202 are secured to main parachute 208 and/or reefing rings 210 until reefing cutter 212 severs cut loop 216, parachute inlet control system 200 also serves the function of a conventional reefing line, and thus prevents main parachute 208 from initially over-inflating or otherwise spreading excessively and becoming a leading parachute. Therefore, parachute inlet control system 200 facilitates greater control of the inflation and/or operation of main parachute 208. Further, the inflation, reefing, and disreefing events of one or more main parachutes 208 within a parachute cluster may thus achieve a degree of synchronization beyond that which is possible with typical clustered parachute systems.

As noted previously, even a single parachute can suffer from lack of canopy air inlet control during the initial inflation phase, which can lead to a parachute malfunction, parachute damage, and/or loss of or damage to a payload. Accordingly, parachute inlet control system 200 may be coupled to a single main parachute to provide improved inflation and disreefing control.

Additionally, parachute inlet control system 200 may be configured to facilitate multiple reefing stages for a parachute, for example main parachute 208. In accordance with various exemplary embodiments, parachute inlet control system 200 may function as the first reefing stage of main parachute 208. Additional reefing systems may be provided on main parachute 208 to obtain a multi-stage reefed inflation. For example, main parachute 208 may also be coupled to a second reefing line and to a third reefing line that is longer than the second reefing line. Parachute inlet control system 200 may then be coupled to main parachute 208 in a manner configured to function as a first reefing line shorter than the second reefing line. In this way, main parachute 208 may achieve a multi-stage reefed inflation responsive to operation of parachute inlet control system 200 and one or more additional reefing lines, allowing main parachute 208 to achieve a fully inflated configuration in stages. Multi-stage inflation may be highly desirable, for example when main parachute 208 is deployed when the associated payload is traveling at a high velocity.

Figure 3:
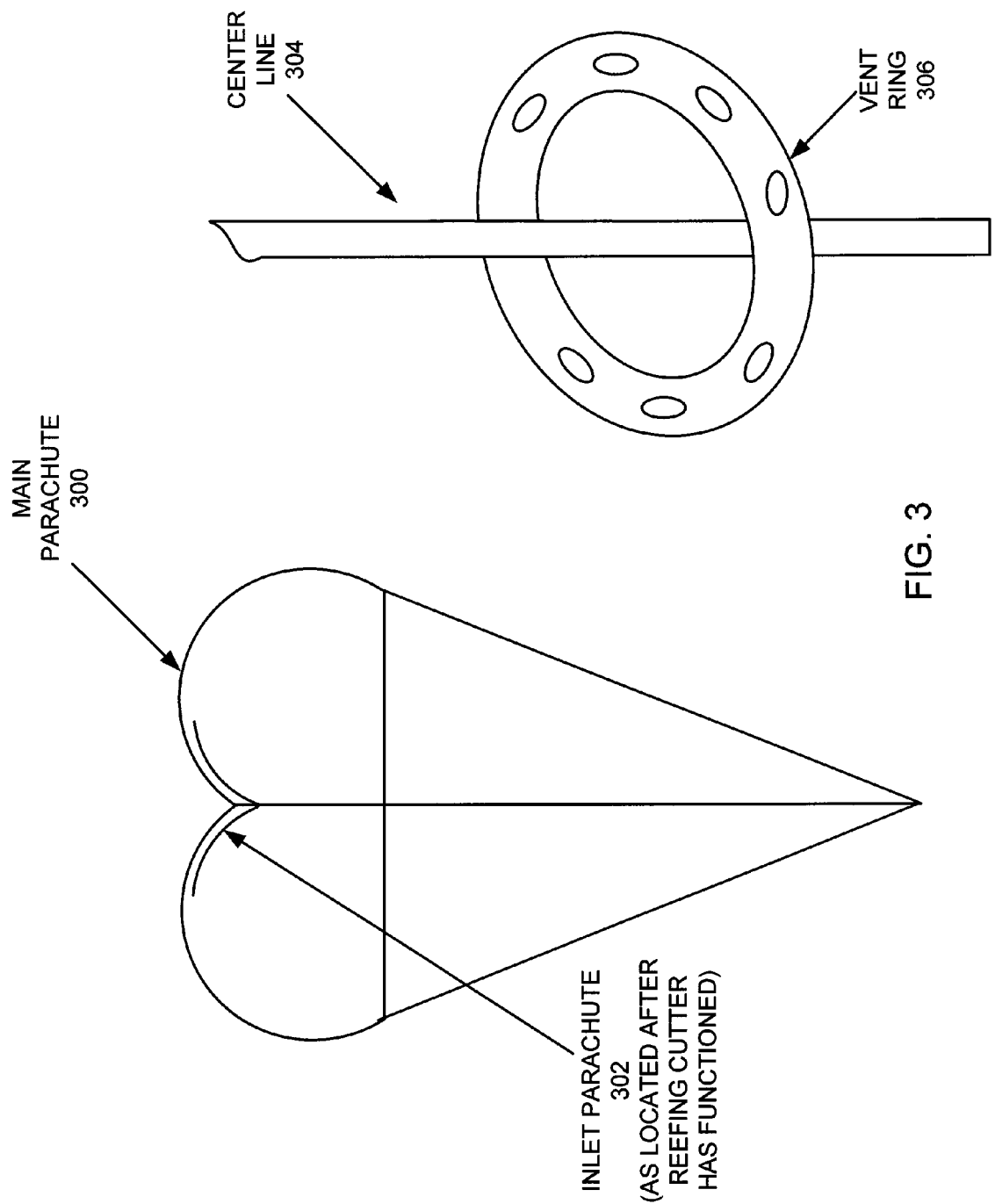
FIG. 3 illustrates a side view of an inflated center-lined parachute, and an isometric view of a parachute vent ring in accordance with an exemplary embodiment.

Because many main parachutes are configured with a center line, with reference now to FIGS. 1D and 3, and in accordance with various exemplary embodiments, parachute inlet control system 200 may be utilized in conjunction with a main parachute having a center line, for example main parachute 300 in FIG. 3. Center line 304 of main parachute 300 is passed through a vent centrally located on inlet parachute 302. Because friction may damage center line 304 and/or inlet parachute 302, the edges of the vent through which center line 304 is passed have a friction reducing means installed. For example, the edges of the vent may be coated with a friction reducing material, such as Teflon® material, Spectra® fabric, and/or the like. Alternatively, a vent ring 306, for example a plastic or metallic ring, may form the edge of the vent. Vent ring 306 is then coupled to the main body of inlet parachute 302 via any suitable technique and/or means, as desired.

When a reefing cutter is activated, inlet parachute 302 separates from the reefing rings coupling inlet parachute 302 to main parachute 300. Inlet parachute 302 then rises up along center line 304 toward the apex of main parachute 300. In this manner, inlet parachute 302 does not interfere with the full inflation of main parachute 300.

However, in general the coupling of one or more reefing rings to the skirt of a main parachute is a weak link in the resulting parachute assembly. Stated another way, responsive to a sufficient force, one or more reefing rings may be ripped away from the main parachute. Additionally, a main parachute may be configured without a reefing ring at one or more locations. Accordingly, with reference again to FIG. 2A, parachute inlet control system 200 may be configured to reduce the force on one or more reefing rings associated with a main parachute and/or to interface with a main parachute having one or more locations without a reefing ring. In certain exemplary embodiments, parachute inlet control system 200 is configured to interface with a main parachute having no reefing rings. Moreover, in accordance with an exemplary embodiment, parachute inlet control system 200 is configured with one or more lacing loops 204 and/or inlet vent lines configured to interface with a main parachute suspension line, a main vent line, and/or other portions of a main parachute.

For example, certain main parachutes, such as the U.S. government standard G-11 cargo parachute (a main parachute having a 120 gore, 100 foot diameter construction) have one or more locations on the intake skirt where a reefing ring is not present. For example, the G-11 cargo parachute typically utilizes four reefing cutters arranged at 90 degree intervals around the intake skirt; accordingly, the intake skirt of a G-11 parachute is configured with four corresponding locations lacking a reefing ring. In various exemplary embodiments, however, parachute inlet control system 200 is configured with a reefing cutter 212 at only one location. Thus, coupling this particular parachute inlet control system 200 to this particular G-11 cargo parachute as described above may leave the skirt of the G-11 parachute unreefed at the remaining three legacy reefing cutter locations (moreover, as can be appreciated, many other reefing cutter/reefing ring location mismatches may occur between a particular main parachute and a particular parachute inlet control system 200, and may be suitably addressed as per the below).

In order to avoid this undesirable condition, one or more lacing loops 204 associated with an inlet parachute 202 may be threaded between, encircled around, and/or otherwise coupled to or interfaced with a main parachute suspension line, for example a main parachute suspension line proximate to a location on the main parachute skirt lacking a reefing ring. In this manner, a suitable amount of control over the inflation of the main parachute is facilitated, and parachute inlet control system 200 can impart a force to the main parachute at these locations. Additionally, because parachute inlet control system 200 is now coupled to the main parachute in additional locations, stress on the remaining main parachute reefing ring(s) (for example, reefing rings adjacent to the area on the main parachute skirt lacking reefing rings) is reduced, further reducing the chance of parachute failure. Moreover, one or more lacing loops 204 may at least partially encircle, surround, thread through, weave between, and/or otherwise interface with and/or couple to one or more main parachute suspension lines, as desired.

Additionally, a main parachute may be configured without reefing rings, and parachute inlet control system 200 may thus be configured to be coupled to a main parachute lacking reefing rings in order to at least partially control inflation, reefing, and/or disreefing of the main parachute. In an exemplary embodiment, parachute inlet control system 200 is coupled to a main parachute by encircling one or more suspension lines of the main parachute with a lacing loop 204. In this manner, controlled inflation of the main parachute may be facilitated, even though the main parachute lacks reefing rings. Thus, the skirt of a main parachute may suitably be controlled, configured, managed, and/or otherwise guided before, during, and/or after deployment by use of parachute inlet control system 200, as desired.

As discussed previously, with reference now to FIGS. 4A and 4B, a main parachute 208 (for example, main parachute 408) may utilize a pulled down vent configuration (as shown in FIG. 4B, and as further illustrated in FIG. 1D by main parachute 170 having a pulled down vent configuration responsive to the presence of center line 172) because this configuration allows main parachute 408 to expand and produce a larger projected diameter than a similar main parachute 408 configured with a canopy lacking a pulled down vent. In accordance with an exemplary embodiment, parachute inlet control system 200 may be configured for use with a main parachute 408 having a center line, for example pull-down strap 420. When parachute inlet control system 200 is deployed in connection with main parachute 408, main parachute 408 is allowed to partially inflate as illustrated in FIG. 4C. In connection with a disreefing event for main parachute 408, inlet parachute 402 separates from the skirt of main parachute 408 and is retained around the pulled down vent area of main parachute 408, as illustrated in FIG. 4D.

Figure 4E:
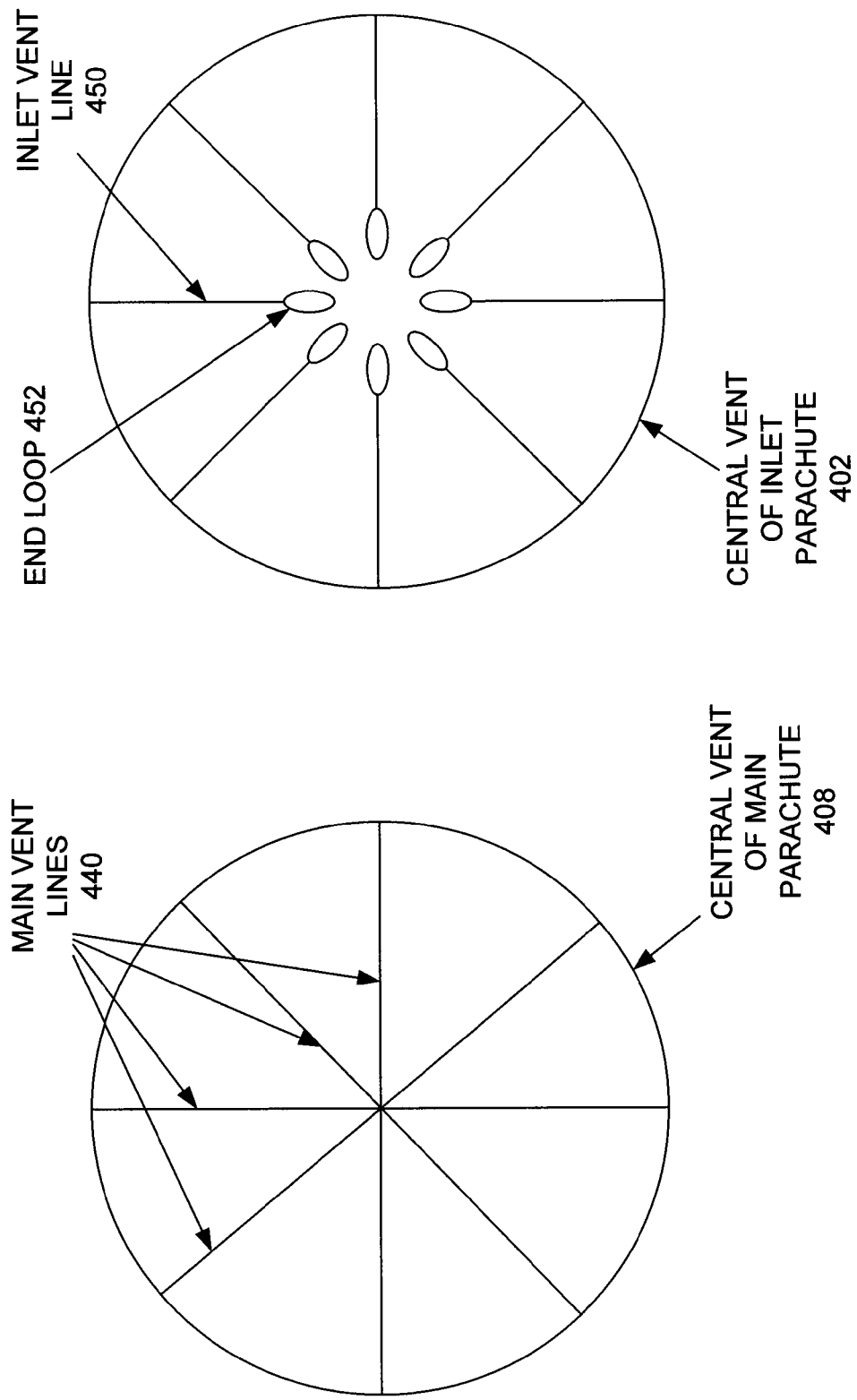
FIG. 4E illustrates vent lines of a main parachute and vent lines of an inlet parachute in accordance with an exemplary embodiment.
Figure 4F:
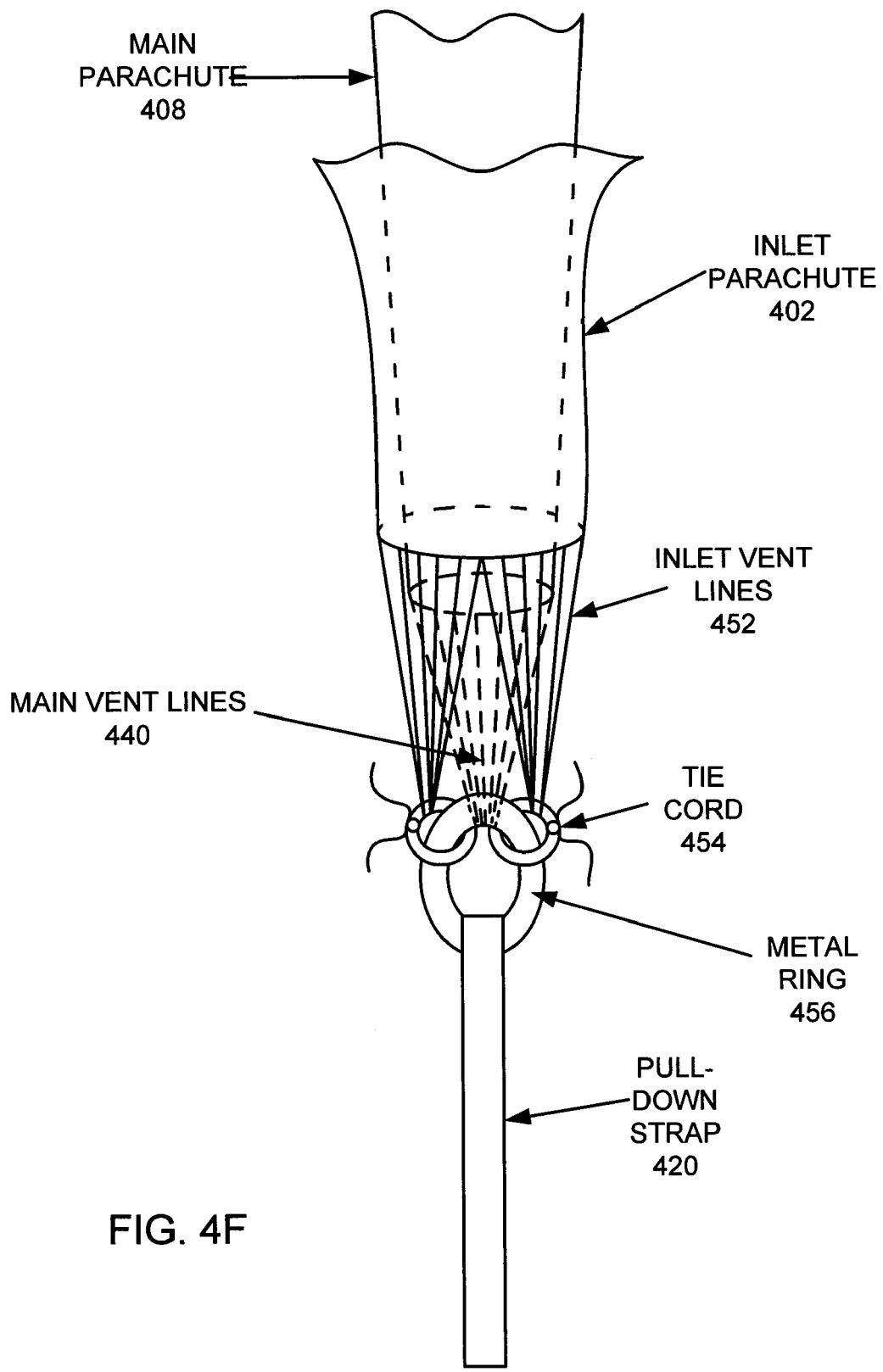
FIG. 4F illustrates a main parachute and an inlet parachute coupled to a pull-down strap in accordance with an exemplary embodiment.

Moreover, with reference to FIG. 4E, cordage or webbing members, such as main vent lines 440 (often constructed similarly to a suspension line) typically extend across the central vent of main parachute 408 in order to transfer forces and/or loads, for example from one structural member of main parachute 408 to another structural member located on the opposite side of main parachute 408. Parachute inlet control system 200 may also suitably be configured with an inlet parachute 402 having continuous inlet vent lines 450; however, parachute inlet system 200 may preferably be configured with an inlet parachute 402 having inlet vent lines 450 configured with terminal end loops 452.

In an exemplary embodiment, inlet parachute 402 is installed around the pulled down vent of main parachute 408. Inlet parachute 402 is coupled to pull-down strap 420 via inlet vent lines 450. For example, the end loop 452 of each inlet vent line 450 may be coupled to a metal ring 456 via one or more tie cords 454. Metal ring 456 is coupled to pull-down strap 420 via stitching or other suitable method. Main vent lines 440 are also coupled to metal ring 456. Moreover, pull-down strap 420 may be coupled to main vent lines 440 and/or inlet vent lines 450 via a metal ring, a tie cord, stitching, and/or any other suitable mechanism or method.

Moreover, with reference again to FIGS. 2A and 2B, in certain exemplary embodiments, lacing loops 204 of parachute inlet control system 200 are sequentially laced around the periphery of main parachute 208 and terminate at a single point at the skirt of inlet parachute 202. In these configurations, it may not be desirable to allow an expended reefing cutter 212 to remain on the skirt of inlet parachute 202 after operation of reefing cutter 212. For example, when inlet parachute 202 is released from the periphery of main parachute 208, inlet parachute 202 may rapidly rise into the interior of main parachute 208, particularly when main parachute 208 is configured with a pulled down vent. Turbulence and/or other forces may then force the expended reefing cutter 212 into contact with a portion of main parachute 208, potentially rupturing and/or otherwise damaging or impairing the operation of main parachute 208. Therefore, in certain exemplary embodiments, reefing cutter 212 may be configured to fall away from inlet parachute 202 after operation of reefing cutter 212 in order to prevent contact with main parachute 208 and/or other components of parachute inlet control system 200. In other exemplary embodiments, reefing cutter 212 and/or other components of parachute inlet control system 200 may be configured to retain reefing cutter 212 at a desired location with respect to main parachute 208, such as adjacent the skirt of main parachute 208.

Figure 5:
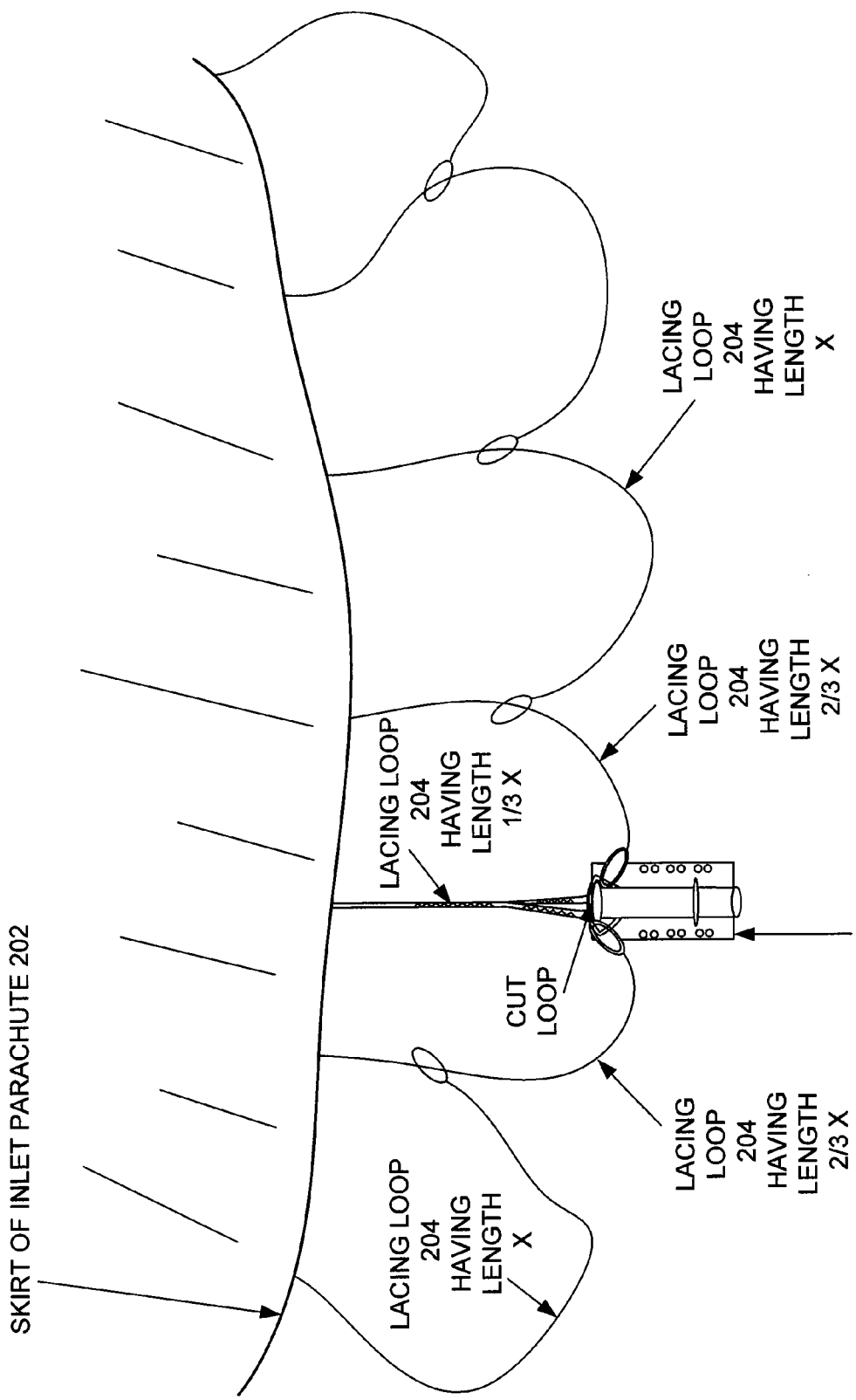
FIG. 5 illustrates portions of a parachute inlet control system configured to facilitate retaining a reefing cutter near the skirt of a main parachute after operation of the reefing cutter in accordance with an exemplary embodiment.

For example, with reference now to FIG. 5, in accordance with an exemplary embodiment, parachute inlet control system 200 is configured with lacing loops 204 having a length X. A reefing cutter 212 is coupled to inlet parachute 202 via a lacing loop 204 having a length of about one-third (⅓) X. Additionally, one or more lacing loops 204 coupled to reefing cutter 212 are configured with a length of about two-thirds (⅔) X. This combination of lacing loops 204 allows reefing cutter 212 and/or the end loops of one or more lacing loops 204 to be located generally proximate the skirt of main parachute 208, rather than generally proximate the skirt of inlet parachute 202. Moreover, longer and/or shorter lengths for particular lacing loops 204 may be utilized, as desired, and the examples provided are given by way of instruction and not by way of limitation. A cordage or webbing loop may thus join lacing loops 204 and/or reefing cutter 212 to the skirt of main parachute 208 without deforming main parachute 208 and/or inlet parachute 202. In this manner, after inlet parachute 202 has deployed, and reefing cutter 212 has functioned, inlet parachute 202 unlaces from the skirt of main parachute 208, and reefing cutter 212 is retained along the skirt of main parachute 208. Thus, reefing cutter 212 is prevented from moving further into the interior of main parachute 208 and/or damaging other components of parachute inlet control system 200.

As will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A parachute inlet control system, comprising:
   an inlet parachute; and
   a plurality of lacing loops configured to couple the inlet parachute to a main parachute;
   wherein each of the plurality of lacing loops is configured with an end loop, and
   wherein, when the inlet parachute is coupled to the main parachute, at least one of the plurality of lacing loops is threaded through the end loop of another of the plurality of lacing loops.

2. The system of claim 1, wherein the inlet parachute is configured to inflate in the inlet area of the main parachute.

3. The system of claim 1, wherein, when the inlet parachute is coupled to the main parachute, the plurality of lacing loops are threaded through reefing rings on the main parachute.

4. The system of claim 1, wherein the length of each of the plurality of lacing loops is between 10 percent of the diameter of the inlet parachute and 50 percent of the diameter of the inlet parachute.

5. The system of claim 1, wherein the inlet parachute is configured to cause airflow between the inlet parachute and the main parachute to force a skirt of the main parachute into an opened shape.

6. The system of claim 1, further comprising a plurality of inlet vent lines configured to couple to a center line of the main parachute.

7. The system of claim 1, further comprising a reefing cutter, wherein the reefing cutter is configured to sever at least one of the lacing loops responsive to at least one of: an activation command received by the reefing cutter, a predetermined time period, altitude of a payload, or velocity of a payload.

8. A method for inflating a parachute, the method comprising:
   providing an inlet parachute; and
   coupling the inlet parachute to a main parachute via a plurality of lacing loops,
   wherein each lacing loop is configured with an end loop,
   wherein at least one of the plurality of lacing loops is threaded through the end loop of another of the plurality of lacing loops, and
   wherein the inlet parachute is configured to inflate within the inlet area of the main parachute.

9. The method of claim 8, wherein coupling the inlet parachute to the main parachute comprises:
   threading a first lacing loop of the inlet parachute through a first reefing ring located on a skirt of the main parachute;
   threading a second lacing loop of the inlet parachute through the end loop of the first lacing loop; and
   threading the second lacing loop through a second reefing ring located on the skirt of the main parachute.

10. The method of claim 8, further comprising inflating the inlet parachute to cause airflow between a skirt of the inlet parachute and a skirt of the main parachute to force the skirt of the main parachute into an opened shape.

11. The method of claim 10, wherein the size of the opened shape is determined by the length of the plurality of lacing loops.

12. The method of claim 10, wherein threading the first lacing loop through the first reefing ring prevents the main parachute from fully opening when the main parachute is deployed.

13. The method of claim 9, wherein the first lacing loop is threaded through multiple reefing rings on the skirt of the main parachute.

14. The method of claim 8, wherein the main parachute is configured without reefing rings, and wherein coupling the inlet parachute to the main parachute comprises encircling a lacing loop of the inlet parachute around a suspension line of the main parachute.

15. The method of claim 14, wherein one lacing loop is encircled around multiple suspension lines of the main parachute.

16. The method of claim 14, wherein encircling a lacing loop of the inlet parachute around a suspension line of the main parachute prevents the main parachute from fully opening when the main parachute is deployed.

17. The method of claim 10, further comprising releasing at least one of the plurality of lacing loops to cause the inlet parachute to cease functioning as a reefing component for the main parachute.

18. The method of claim 10, further comprising severing a cut loop to cause the inlet parachute to separate from the skirt of the main parachute, wherein the cut loop passes through the end loop of at least one of the plurality of lacing loops.

19. The method of claim 10, wherein the main parachute is part of a parachute cluster comprising multiple main parachutes, and wherein each main parachute in the parachute cluster is coupled to a corresponding inlet parachute.

20. The method of claim 10, wherein inflation of the inlet parachute causes the main parachute to ingest air more rapidly than if the main parachute was not coupled to an inlet parachute.

* * * * *